US012736936B2

(12) United States Patent
Hengstler et al.

(10) Patent No.: US 12,736,936 B2
(45) Date of Patent: Sep. 15, 2026

(54) METHOD FOR OPERATING A FIELD DEVICE, AND SYSTEM FOR OPERATING FIELD DEVICES

(71) Applicant: VEGA Grieshaber KG, Wolfach (DE)

(72) Inventors: Clemens Hengstler, Haslach (DE); Stefan Kaspar, Hofstetten (DE)

(73) Assignee: VEGA Grieshaber KG, Wolfach (DE)

( * ) Notice: Subject to any disclaimer, the term of this patent is extended or adjusted under 35 U.S.C. 154(b) by 442 days.

(21) Appl. No.: 18/263,901

(22) PCT Filed: Feb. 3, 2021

(86) PCT No.: PCT/EP2021/052569
§ 371 (c)(1),
(2) Date: Aug. 2, 2023

(87) PCT Pub. No.: WO2022/167073
PCT Pub. Date: Aug. 11, 2022

(65) Prior Publication Data
US 2024/0111264 A1 Apr. 4, 2024

(51) Int. Cl.
*H04L 9/00* (2022.01)
*G05B 19/042* (2006.01)
*H04L 9/32* (2006.01)

(52) U.S. Cl.
CPC ........ *G05B 19/0425* (2013.01); *H04L 9/3239* (2013.01); *H04L 9/50* (2022.05); *G05B 2219/23213* (2013.01); *G05B 2219/25428* (2013.01)

(58) Field of Classification Search
CPC ...... G05B 19/0425; G05B 2219/23213; G05B 2219/25428; G05B 19/0426; G05B 19/042; G05B 19/0428; H04L 9/3239; H04L 9/50; G06F 21/64; G06F 21/32
See application file for complete search history.

(56) References Cited

U.S. PATENT DOCUMENTS

2008/0288933 A1* 11/2008 Budmiger ............. G01F 1/8431 709/227
2009/0264070 A1* 10/2009 Lim ................... G06Q 30/0267 455/41.2

(Continued)

FOREIGN PATENT DOCUMENTS

DE 102016118614 A1 4/2018

OTHER PUBLICATIONS

PCT/EP2021/052569 International Search Report mailed Sep. 29, 2021.
CN 202180092598.x Office Action dated Mar. 12, 2026.

*Primary Examiner* — Alicia M. Choi
(74) *Attorney, Agent, or Firm* — Wood Herron & Evans LLP

(57) ABSTRACT

The present invention relates to a method for operating an automation field device, having an input interface, a memory which stores at least one set of parameters for operating the field device, and having a first communication interface, wherein, if at least one parameter in the set of parameters is changed by a first entity, the following steps are carried out in the following order: —transmitting at least the changed parameter(s) and/or data calculated therefrom to a superordinate unit, —informing a second entity of the change.

20 Claims, 2 Drawing Sheets

(56) References Cited

U.S. PATENT DOCUMENTS

2009/0309692 A1* 12/2009 Chomik ............... G05B 19/042
340/3.5
2015/0156805 A1* 6/2015 Isenmann .............. G08C 17/02
455/426.1
2016/0274557 A1* 9/2016 Froehner ............ G05B 19/0426
2017/0344201 A1* 11/2017 Furihata ............. G05B 23/0216
2018/0097873 A1* 4/2018 Benkert ................ G06F 3/0482
2018/0292098 A1* 10/2018 Bandyopadhyay ..........................
G05B 19/0426
2019/0253965 A1* 8/2019 Gan ...................... H04W 52/02
2020/0012249 A1* 1/2020 Altendorf ............. H04W 12/06
2020/0036520 A1 1/2020 Kilian
2020/0096962 A1* 3/2020 Augustin ............. G05B 19/058
2020/0226123 A1* 7/2020 Nixon ................. G06F 16/2379

* cited by examiner 1
4
11
6
3
5
9
7
M
M
12

31
34
33
32
35
3
30
37

METHOD FOR OPERATING A FIELD DEVICE, AND SYSTEM FOR OPERATING FIELD DEVICES

RELATED APPLICATIONS

This application is a U.S. National Application of PCT/EP2021/052569 filed Feb. 3, 2021, which published as PCT Publication WO2022/167073, which is incorporated by reference herein in its entirety.

FIELD OF THE INVENTION

The present application relates to a method for operating a field device.

BACKGROUND OF THE INVENTION

Various methods for operating field devices and a multitude of field devices are known from the prior art.

In this case, various technical devices that are directly related to a production process are subsumed under the term "field device". Here, "field" refers to the area outside of control centers. Thus, field devices may be, in particular, actuators, sensors and measuring transducers.

Field devices that serve for recording and/or influencing process variables are often used in process automation engineering. Filling level measuring devices, limit level measuring devices and pressure measuring devices with sensors recording the respective process variables (filling level, limit level or pressure) are examples of such field devices.

The present application also relates to self-contained field devices, in particular to self-contained measuring assemblies, such as self-contained filling level or limit level sensors, for instance. The self-contained filling level or limit level sensors are preferably configured as radar sensors and—in order to ensure the self-containedness of the sensors—contain, in addition to a measurement sensor for detecting measurement data, a transmitting device for the, preferably wireless, transmission of detected measurement data or measurement values, as well as their own power supply. Preferably, the transmitting device may be a radio module for narrow-band radio technology (LoRa, Sigfox, LTE-M, NB-IOT), which transmits the measurement data or measurement values to a cloud, i.e. a server in the World Wide Web. The power supply unit is preferably configured as a battery or rechargeable battery and may additionally include an energy harvesting module.

Typical areas of use for such self-contained field devices include, in particular, inventory management or measuring tasks on mobile containers.

So far, known field devices of the above-mentioned type make it possible to transmit measurement values, so that a higher-level unit triggers a predetermined action based on the acquired measurement value. For example, based on the measurement value of a filling level measuring device, when a threshold value is exceeded, an intake pipe may be closed or an outlet pipe opened.

Self-contained field devices are characterized by a particularly simple installation without attaching a communication or power supply line, and thus provide particularly flexible arrangement options, that is, particularly their attachment in the process environment. The measurement values determined by these field devices are typically transmitted into a cloud, i.e. onto a server in the World Wide Web, using a narrow-band radio technology (LoRa, Sigfox, NB-IOT). Typical areas of use of such field devices include areas such as flood forecasting, inventory management or also other decentralized measuring tasks. Due to the direct connection with the World Wide Web, such field devices are inherently exposed to a permanent threat by hacker attacks from the net.

Moreover, field devices generally have locally operable parameterization interfaces. An unauthorized or inadvertent modification of the parameterization may completely falsify the output measurement value and consequently, particularly in the case of safety applications, result in large damage to the process plant, and also injury to humans and the environment.

In recent times, additional digital interfaces (e.g. Bluetooth) are increasingly implemented in field devices, which facilitate a parameterization of the field devices on-site, but also increase the possibilities and probabilities for an inadvertent or unauthorized parameter modification.

There is therefore a need for increased security for such field devices and their operation.

Moreover, field devices are also used in critical infrastructure facilities (KRITIS), such as energy (electricity, gas oil), transport (air, train, waterways, roads), drinking water supply or also digital infrastructure, for example. In these areas, there is also a higher requirement for making field devices resistant to negligent or intentional attacks, particularly hacker attacks. The directive 2016/1148 (NIS-directive) passed by the European Parliament, which has been implemented in the meantime in national law by the member states of the European Union, is an example for this.

SUMMARY OF THE INVENTION

It is the object of the present invention to further develop a method for operation of field devices, and to provide a system for operating field devices, so that the probability for faulty parameterizations is further reduced and possible external attacks can be recognized and prevented. Moreover, it should be possible to verify the parameters that are valid at a point in time.

A method according to the invention for operating an automation technology field device with an input interface, a storage unit, in which at least one parameter set for the operation of the field device is stored, and with a first communication interface is characterized in that in case of at least one parameter of the parameter set being modified by a first entity, at least the modified parameter or the modified parameters and/or data computed therefrom are transmitted to a higher-level unit and a second entity is informed about the modification.

Thus, if a parameter of the monitored parameter set is modified in the field device by a first entity, a piece of information about this modification is automatically transmitted to a higher-level unit. The informing process may in this case take place by transmitting the modified parameter or the entire parameter set, as well as by transmitting data computed therefrom. The data computed from the modified parameter or the parameter set with the modified parameters may include a fingerprint or hash value and/or an encrypted transmission of the parameter set, for example.

In this case, the first entity may be an operator, for example, carrying out an adjustment on the field device. However, the first entity may also be another device accessing the field device and carrying out a parameter modification. For example, the first entity may be a mobile operating device or remote computer by means of which the operator accesses the field device via a communication interface in order to parameterize the field device or read out data.

The higher-level unit—if it has been informed about a modification of a parameter—may then in turn inform a second entity about the modification that was carried out. Depending on which information was transmitted to the higher-level unit, e.g. on whether the modified parameter or the entire parameter set was transmitted, or only a hash value, the higher-level unit can inform the second entity only about the fact that a parameter was modified, or can specifically report which modification was made, i.e. in particular, which parameter or parameters was or were modified.

The second entity may also have different forms, e.g. be an operator of the higher-level unit, another device informed by the higher-level unit or a group or combination thereof.

The present method thus automatically uncovers any parameter modification and informs, for instance, a person responsible (monitoring person) or persons responsible, so that necessary countermeasures can be initiated, if necessary.

In order to permit the second entity to be informed as comprehensively as possible, the entire parameter set can be transmitted in the transmitting step. Thus, it is ensured that the second entity has at its disposal all relevant information for assessing the modification made in the current version and is thus capable of optimally assessing the modification made.

Additionally or alternatively, a hash value computed from the parameter set may also be transmitted to the higher-level unit. Such a hash value uniquely characterizes a parameter set, so that it is possible at a later point in time to trace which parameter set was valid at an earlier point in time, for instance. In this manner, it is possible—even without transmitting the complete parameter set to the higher-level unit—for example to verify which parameters were stored in the field device at the time damage occurred. For this purpose, the parameter sets may, for example, be deposited on an additional storage medium, which, for example, is accessible only for the owner of the field device.

If only the hash value is transmitted to the higher-level unit, it can be confirmed by the second entity, for example, that a parameter modification at a certain point in time is admissible. Additionally or alternatively, an authorization of the first entity can be confirmed.

A hash function is a mathematical map mapping a large input set (the keys) to a smaller target set (the hash values). Therefore, a hash function generally is not one-to-one. The input set may contain elements of different lengths; in contrast, the elements of the target set most frequently have a fixed length.

Most frequently, the hash values are scalar values from a limited subset of the natural numbers. In this case, a “good” hash function yields values for the (expected) input data so that two different inputs also result in different output values. Therefore, a hash value is also referred to as a fingerprint because it constitutes an almost unique labeling of a larger data set, just as a fingerprint almost uniquely identifies a human being.

In the present case, a parameter set or a subset of a parameter set is mapped to a hash value in this way, and this parameter set or subset is thus distinctly labeled.

Additionally or alternatively, a modification counter may be computed for the parameter set. Such a modification counter may be incremented at each modification of a parameter or parameter set, for example, so that it can be recognized at any time whether the currently valid parameter set was modified compared to a verified parameter set.

In one variant of the method, the parameter set and/or the data computed therefrom can be stored in a distributed ledger.

The term distributed ledger describes a technique that can be used for documenting certain transactions. In contrast to the classic approach in which a central ledger is generally managed by only one entity, an arbitrary number of copies of the ledger, which are of equal importance in principle, are maintained by different parties. It is ensured by suitable measures that transactions that are to be newly added are entered in all copies of the ledger, and an agreement (consensus) about the current status of the ledger occurs at each time.

In the present application, the parameter sets and/or hash values and/or other information can thus be stored in the distributed ledger. In this way, the relevant information is transparent and securely stored for all parties involved, e.g. the first entity and/or the second entity and/or an owner and/or an operator and/or a maintenance service and/or a manufacturer of the field device, so that manipulations from all sides can be prevented.

If a faulty parameterization of the field device, for example, results in damage to the field device or the process plant, it is possible to trace from the distributed ledger, based on the hash values, when a parameter modification has taken place. Since the hash value can be uniquely associated with a parameter set, the latter can then be uniquely identified even if it is not known to the manufacturer at first, so that the configuration that has resulted in the damage can be uniquely and transparently traced by all parties. It is thus possible to definitely determine in the case of damage whether the field device was operated with an admissible parameter combination, for example.

For example, the higher-level unit can be configured as a distributed computer network. Such a distributed computer network may be configured as a cloud system, for example, in which evaluations of measurement values determined by the field device take place in addition to monitoring of the parameters of the field device, for instance. For example, this may be offered by the manufacturer of the field devices as software as a service (SaaS).

The computation of the hash value, the modification counter, or an encryption of the parameter set can take place in the higher-level unit. In this way, resources in the field device can be conserved and computationally intensive operations may take place in the higher-level unit. In this way, the capacity of an energy storage unit in the field device can be conserved, for instance, so that a longer self-contained operation is possible.

The transmission can take place cyclically and/or in an event-oriented manner. This means that at least the modified parameter or the modified parameters, the entire parameter set and/or the data computed therefrom are transmitted to the higher-level unit cyclically, i.e. in predeterminable or firmly predetermined time intervals, and/or triggered by predeterminable or firmly predetermined events.

A cyclic transmission, in particular, permits an additional monitoring of the field device because it can be determined in this manner if a transmission by the field device does not take place at the predetermined point in time. In this case, the second entity may also be informed. Alternatively, it may also be provided that the field device or the entire process monitored by the field device is transferred into a secure state if the cyclically transmitted data do not arrive at the higher-level unit.

Further, an encryption can be carried out prior to the transmitting step. By encrypting the transmitted data, it can be ensured that the data are not read out or intercepted and/or manipulated during transmission by unauthorized third parties.

In one embodiment, a relay station may be provided locally. In this case, a local transmission may take place unencrypted, and a transmission from the relay station to the higher-level unit may take place in an encrypted manner, for example. In order to conserve resources of the field device, computing operations may also be outsourced to the relay station.

In a first variant, the method may be configured to be unidirectional. That means transmission from the field device can take place via the communication interface only to the higher-level unit, but the field device is not configured for receiving data via the interface used. It is thus prevented that an additional point of entry for attacks on the field device is created.

In a second variant, the variant is configured to be bidirectional, i.e. the field device is also capable of receiving data via the communication interface. In this variant, it may be provided, for example, that the modified parameter or the modified parameters are activated in the field device only if they have been confirmed by the second entity. In addition, the higher-level unit and/or the second entity is capable of resetting the parameter set back to the last valid value.

In addition to the modified parameter or the modified parameters and/or the data computed therefrom to the higher-level unit, a piece of information about the first entity, in particular a unique identification of the first entity, can be transmitted additionally. By obtaining and transmitting a unique identification of the first entity, the security of the present method can be further enhanced. It is thus possible to uniquely associate every parameter modification with a first entity and store this piece of information together with the information about the parameter modification.

An artificial intelligence for assessing the parameters may be used in the higher-level unit, for example. By using artificial intelligence, the transmitted parameter sets may, for example, be tested for consistency, and information on parameters which do not cause any problems may be collected in a self-learning system. At the same time, a user can be offered support for the parameterization of their field devices, by offering values, e.g. based on a parameter set, which other users have also used and retained, and which therefore have provided for a good performance of the field device.

Additionally or alternatively, the second entity can comprise a device of a monitoring person responsible for the field device, particularly a mobile device. In this way, a person (monitoring person) or group of persons responsible for monitoring the field device can be informed about modifications.

In one variant of the method, it is provided that the device of the monitoring person is informed only if the artificial intelligence has detected an inconsistency of the parameters. In this way, support for the monitoring person by the artificial intelligence is realized, so that a confirmation of a parameter set, for example, is only requested from the monitoring person if the inputted parameters were classified by the artificial intelligence as being problematic.

A system according to the invention for operating field devices, comprising at least one automation technology field device, with an input interface, a storage unit, in which at least one parameter set for the operation of the field device is stored, and with a first communication interface, further comprising at least one higher-level unit with a second communication interface, is characterized in that the field device and the higher-level unit are configured and adapted such that the field device, in case of at least one parameter of the parameter set being modified by a first entity, transmits the modified parameter or the modified parameters or data computed therefrom to the higher-level unit, and a second entity is informed about the modification.

The present system for operating field devices is in this case configured such that parameter modifications are transmitted to the second entity due to the interaction between the field device and the higher-level unit. In this case, the parameter set and/or an identity of the first entity may be checked by the higher-level unit prior to the transmission to the second entity.

In this case, the input interface and the communication interface may also be identical. This means that a communication and an input, for example, be made by means of a Bluetooth radio interface.

For enhancing security, however, the first communication unit may also be configured purely as a transmitting unit. By configuring the communication unit as a pure transmitting unit without a receiving option, the possibility of attacks on the field device via this interface is prevented.

For example, the higher-level unit can be configured as a distributed computer network. By means of a distributed computer network, e.g. a cloud, the availability and accessibility of the higher-level unit can be improved. The parameter set or the value computed from the parameter set can preferably be stored in the distributed computer network, preferably in a distributed ledger.

In particular, the complete parameter set and/or a hash value computed from the parameter set and/or a modification counter can be stored in the distributed computer network, preferably in the distributed ledger.

By storing the above-mentioned values in this distributed and—for all parties involved in the system—transparent manner, it is accomplished that it is always possible to trace at which point in time which parameter set was valid. In this way, cases of damage, for example, can be transparently traced, be it due to or on the process plant or on the field device.

Preferred embodiments, features, and properties of the proposed system correspond to those of the proposed method and vice versa.

Advantageous embodiments and variants of the invention become apparent from the dependent claims and the following description. The features cited individually in the dependent claims may be combined in any technologically meaningful manner both with each other and with the features presented in more detail in the following description, and can represent other advantageous embodiment variants of the invention.

BRIEF DESCRIPTION OF THE DRAWINGS

The present invention is explained in detail below based on exemplary embodiments with reference to the attached Figures. In the Figures.

DETAILED DESCRIPTION OF THE DRAWINGS

Figure 1:
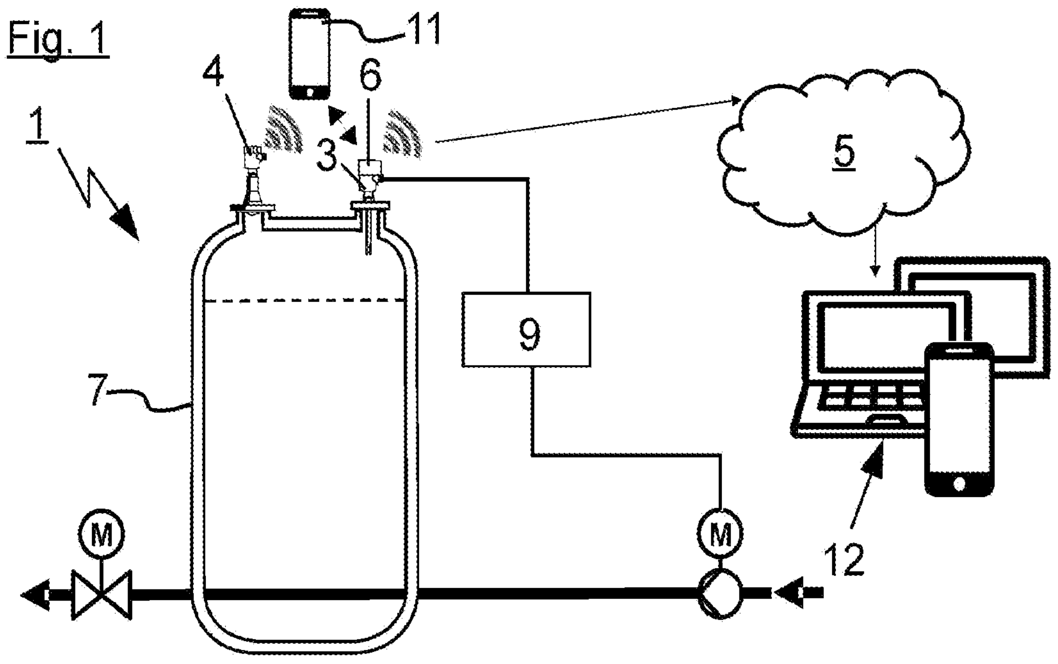
FIG. 1 symbolically shows a system for operating a field device.

FIG. 1 symbolically shows a system 1 for operating a field device, with a first field device 3 and a second field device 4 according to the present application.

In the exemplary embodiment according to FIG. 1, the field devices 3, 4 are both disposed on a tank 7 for measuring the filling level or limit level. In the exemplary embodiment shown, the first field device 3 is configured as a limit level sensor for detecting the maximum filling level of the tank 7 and is connected to a process control unit 9. The process control unit 9 processes measurement values detected by the field device 3, and a pump disposed in the intake pipe running towards the tank 7 is deactivated upon the maximum filling level being reached.

In the exemplary embodiment shown, the second field device 4 is configured as a radar level measuring device and wirelessly transmits its filling level measurement values to a control center.

Both field devices 3, 4 are monitored together in the system 1 for operating field devices.

In the present exemplary embodiment, a higher-level unit of the system 1 is configured as a distributed computer network (cloud) 5, wherein the first field device 3 is connected via a relay 6, and the second field device 4 directly, to the higher-level unit 5. In each case, the communication between the relay 6 and the second field device 4 takes place wirelessly via a radio link.

A first entity 11 is shown in the exemplary embodiment shown in FIG. 1, which in the present case is configured as a mobile terminal device, e.g. as a smartphone of a user. In the present case, the first entity 11 accesses the first field device 3, in order to input it for parameterization, i.e. information on the media to be detected, their density, on the frequency of measurements and on the conditions for the switching command (uncovered/uncovered). If parameters of the detected field device 3 are modified by the first entity 11, the field device recognizes this modification and notifies the higher-level unit 5 thereof via the relay 6. In the present exemplary embodiment, the complete set of parameters, hereinafter also referred to as the parameter set, is in each case transmitted to the higher-level unit 5 and stored therein together with a time stamp. At the same time, the transmitted parameter set is compared to a parameter set stored in the higher-level unit for the first field device 3, and it is checked which parameters have been modified. Fixed rules stating for which parameter modifications an entity 12, which in the present case is represented as a group of devices, is informed about the parameter modification, can be stored in the higher-level unit 5. Alternatively, the informing may also take place every time a parameter is modified, or depending on an analysis of the complete parameter set, e.g. by an artificial intelligence. In addition to the higher-level unit 5 informing the second entity 12, the parameter set or data computed from the parameter set, e.g. a hash value, may be stored in a modification-proof manner in the higher-level unit 5.

In the present exemplary embodiment, the information transmission between the field devices 3, 4 and the higher-level unit 5 is only configured to be unidirectional, i.e. the field devices 3, 4 can only send data to the higher-level unit 5 but are not capable of receiving data from the higher-level unit 5 beyond acknowledgement of the radio communication. In another embodiment of the system 1, however, the connection between the field devices 3, 4 and the higher-level unit 5 may also be configured to be bidirectional, so that it may be possible, for example, that the second entity 12, after a modification, may send a confirmation of a parameter modification or a refusal of the parameter modification to the higher-level unit 5, which documents it and transmits it to the field devices 3, 4. In this case, the first entity 11 may also be informed, either directly by the higher-level unit 5 or indirectly via the field devices 3, 4, about the confirmation or refusal of the parameter modification by the second entity.

In this way, it is possible to realize a dual control principle in which a parameter modification by a first entity 11 on a field device 3, 4 only becomes effective if confirmed by a second entity 12. The two devices depicted in the exemplary embodiment of FIG. 1 as the first entity 11 and the second entity 12 may each be assigned to one employee, so that only two employees are able in each case to carry out a parameter modification together. Consequential damage due to inadvertent or unwanted parameter modifications can thus be minimized and ideally completely avoided.

By transmitting the parameters to the higher-level unit 5, it is also possible to create a digital twin for each field device 3, 4, i.e. a digital copy, in which the type of field device, the stored parameters and further relevant information about the field devices are stored.

Figure 2:
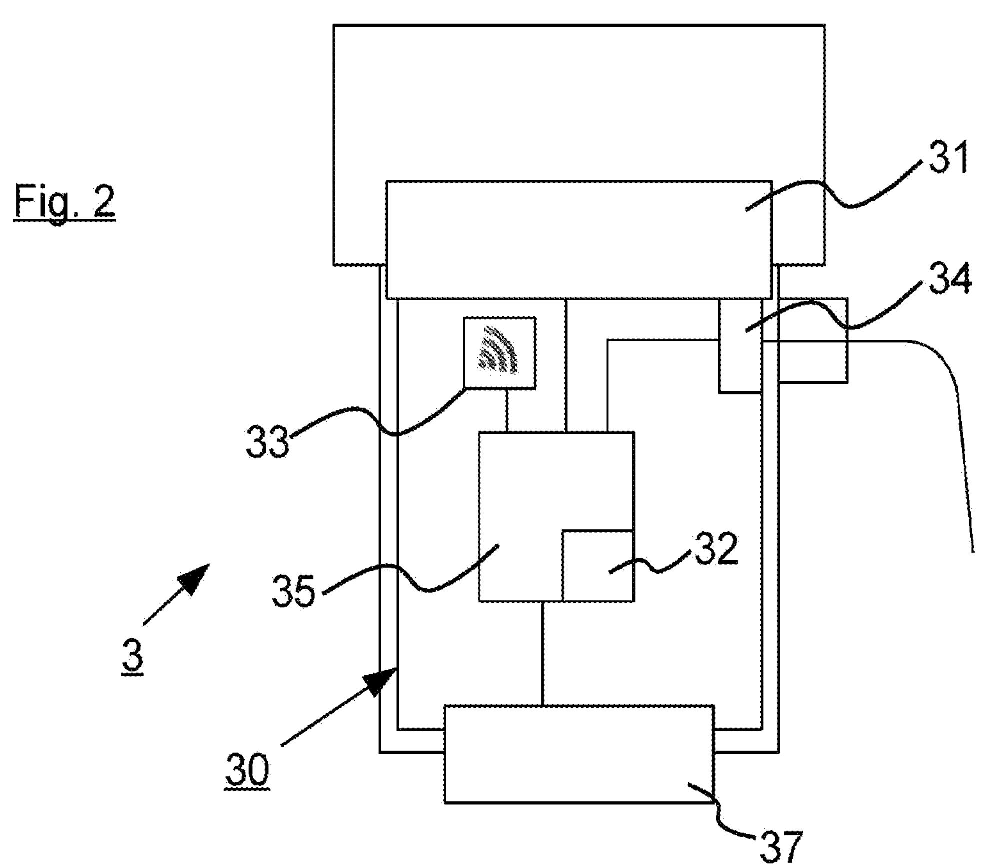
FIG. 2 shows a field device as it may be used in the system of FIG. 1.

FIG. 2 shows an exemplary embodiment of a field device as it may be used in the system of FIG. 1. The field device shown in FIG. 2 in this case corresponds to the first field device 3, which communicates via the relay 6 with the higher-level unit 5 in the exemplary embodiment of FIG. 1.

In the present case, the field device 3 is only schematically illustrated and has an electronics unit 30 by means of which measurement values determined by a sensor 37 can be processed and can be provided, for example, to the process control unit 9 via an output interface 34. Moreover, the field device 3 has an input interface 31 by means of which various inputs, configurations and parameter modifications can also be carried out directly on the field device 3. In the present exemplary embodiment, the final parameter set valid for the field device 3 is stored in a storage unit 32 of a computing unit 35 of the electronics unit 30. If the computing unit 35 registers a modification of parameters in the storage unit 32, then this is communicated to the higher-level unit 5 via a communication interface 33 arranged in the electronics unit 30. For example, the communication interface 33 may be configured as a short-range radio interface, e.g. as a Bluetooth of NFC interface, or may alternatively utilize a narrow-band radio technology, e.g. Lora or NB OT. Since a short-range radio interface with a small range was chosen in the present exemplary embodiment, the communication with the higher-level unit 5 takes place via the relay 6, as is shown in FIG. 1.

Moreover, the communication interface 33 can be used for radio communication with the first entity 11 for making the commissioning and parametrization of the field device 3 easier. In this case, however, the communication interface 33 needs to be configured to be bidirectional.

Figure 3:
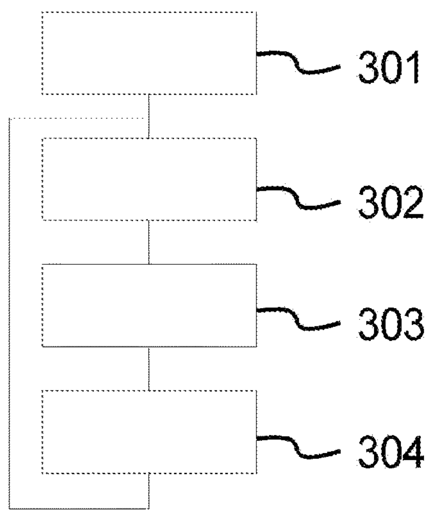
FIG. 3 shows a first embodiment of a method for operating a field device.

FIG. 3 shows an exemplary method for operating a field device.

In a first step 301, the method is started. In a second step 302, it is checked whether a parameter modification has been carried out. If that is the case, a piece of information about the parameter modification is sent to the higher-level unit 5 in a third step 303. In a fourth step 304, the higher-level unit 5 then informs the second entity 12, and the method begins again with the second step 302. The second step 302 may take place, for example, cyclically, i.e. in fixed time intervals, or in an event-oriented manner, e.g. if an input is made on the field device or if a connection is established. The third step, in which a transmission to the higher-level unit 5 takes place, can also be carried out cyclically or in an event-oriented manner; also, a combination of cyclic and event-oriented execution is possible for both steps.

Figure 4:
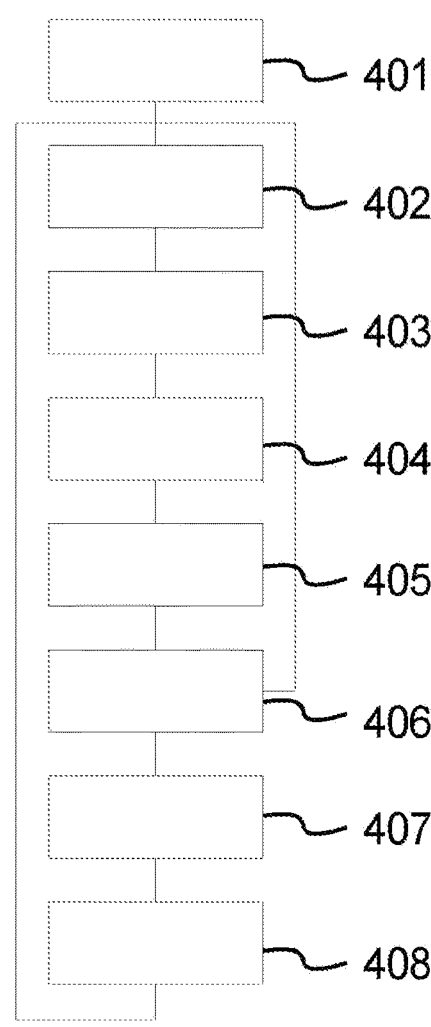
FIG. 4 shows a second embodiment of a method for operating a field device.

FIG. 4 shows a variant of the method according to the present application, which is expanded in comparison with the method according to FIG. 3.

Also in this case, the method is started in a first step 401. Before a cyclic and event-controlled check for parameter modifications takes place in a second step 402. In a third step 403, the information is first encrypted for transmission to the higher-level unit 5, and then transmitted in an encrypted form to the higher-level unit 5 in the fourth step 404. In a fifth step 405, the transmitted data are, on the one hand, stored in an encrypted form, and, on the other hand, decrypted and subjected to a check by an artificial intelligence in step 406. If the transmitted parameters are classified as not being problematic by the artificial intelligence, the present method starts again with the second step, in which a check for parameter modifications is carried out. If, however, the artificial intelligence comes to the conclusion in the sixth step 406 that problematic modifications, or at least ones that merit checking, were carried out on the parameters, the second entity 12 is modified by the parameter modifications in a seventh step 407. In an eighth step 408, there is a feedback from the second entity 12 via the higher-level unit 5 to the field device 3, wherein this feedback may contain a confirmation of the modifications carried out, a refusal of the modifications carried out, or a change to the parameters. The set parameters are accepted only if there is a feedback, and the method starts again with the second step 402. If there is no feedback from the second entity over a predeterminable time interval, it may be provided, for example, that the field device either continues to be operated with the previously valid parameters or automatically changes into a secure state, by the process monitored by the field device being transferred into a secure state or shut down, for example.

In order to ensure a transparent traceability of parameter modifications and of parameters that are respectively valid at a point in time, it may be provided, for instance, that complete parameter sets or hash values computed from the parameter sets be stored in a distributed ledger, e.g. a blockchain. For the persons involved, all parameter sets or hash values are then uniquely attributable to any time, so that it is always possible—either by means of the parameter set itself of the hash value—to ascertain at which point in time which parameter set was valid and possibly resulted in a malfunction or damage.

REFERENCE SIGNS LIST

1 System
3 First field device
4 Second field device
5 Higher-level unit
6 Relay
7 Tank
9 Process control unit
11 First entity
12 Second entity
30 Electronics unit
31 Input interface
32 Storage unit
33 Communication interface
34 Output interface
35 Computing unit
37 Sensor
301-304 Process steps
401-408 Process steps

The invention claimed is:

1. A method for operating an automation technology field device, with an input interface, a storage unit, in which at least one parameter set for the operation of the field device is stored, and with a first communication interface, wherein
in case of at least one parameter of the parameter set being modified by a first entity, the following steps are carried out in the following order:
transmitting at least the modified parameter or the modified parameters and/or data computed therefrom to a higher-level unit,
informing a second entity about the modification, and
activating the modified parameter or the modified parameters only if they have been confirmed by the second entity.

2. The method according to claim 1, wherein an entire parameter set is transmitted in the transmitting step.

3. The method according to claim 1, wherein a hash value is computed from the parameter set.

4. The method according to claim 1, wherein a modification counter is computed for the parameter set.

5. The method according to claim 1, wherein the parameter set and/or the data computed therefrom are stored in a distributed ledger.

6. The method according to claim 1, wherein the higher-level unit is configured as a distributed computer network.

7. The method according to claim 1, wherein the data computation takes place in the higher-level unit.

8. The method according to claim 1, wherein the transmission takes place cyclically and/or in an event-oriented manner.

9. The method according to claim 1, wherein an encryption is carried out prior to the transmitting step.

10. The method according to claim 1, wherein an artificial intelligence in the higher-level unit evaluates the parameters.

11. The method according to claim 1, wherein a piece of information about the first entity is additionally transmitted.

12. The system according to claim 11 wherein the piece of information about the first entity is a unique identification.

13. The method according to claim 1, wherein the higher-level unit comprises an artificial intelligence for assessing the parameters.

14. The method according to claim 1, wherein the second entity comprises a device of a monitoring person responsible for the field device, particularly a mobile device.

15. The method according to claim 13, wherein the device of the monitoring person is informed only if the artificial intelligence detects an inconsistency of the parameters.

16. A system for operating field devices, with
at least one automation technology field device, with an input interface, a storage unit, in which at least one parameter set for the operation of the field device is stored, and a first communication interface, and
a higher-level unit with a second communication interface, wherein
the field device and the higher-level unit are configured and adapted such that the field device, in case of at least one parameter of the parameter set being modified by a first entity, transmits the modified parameter or the modified parameters or data computed therefrom to the higher-level unit, and then a second entity is informed about the modification and the field device activates the modified parameter or the modified parameters only if they have been confirmed by the second entity.

17. The system according to claim 16, wherein the higher-level unit is configured as a distributed computer network, and the parameter set or the value computed from the parameter set is stored therein.

18. The system according to claim 17, wherein the first communication interface is configured exclusively as a transmitting unit.

19. The system according to claim 17, wherein the first communication interface is configured as a transmitting and receiving unit.

20. The system of claim 17 wherein the parameter set or the value computed from the parameter set is stored in a distributed ledger.

* * * * *